Figure 1:
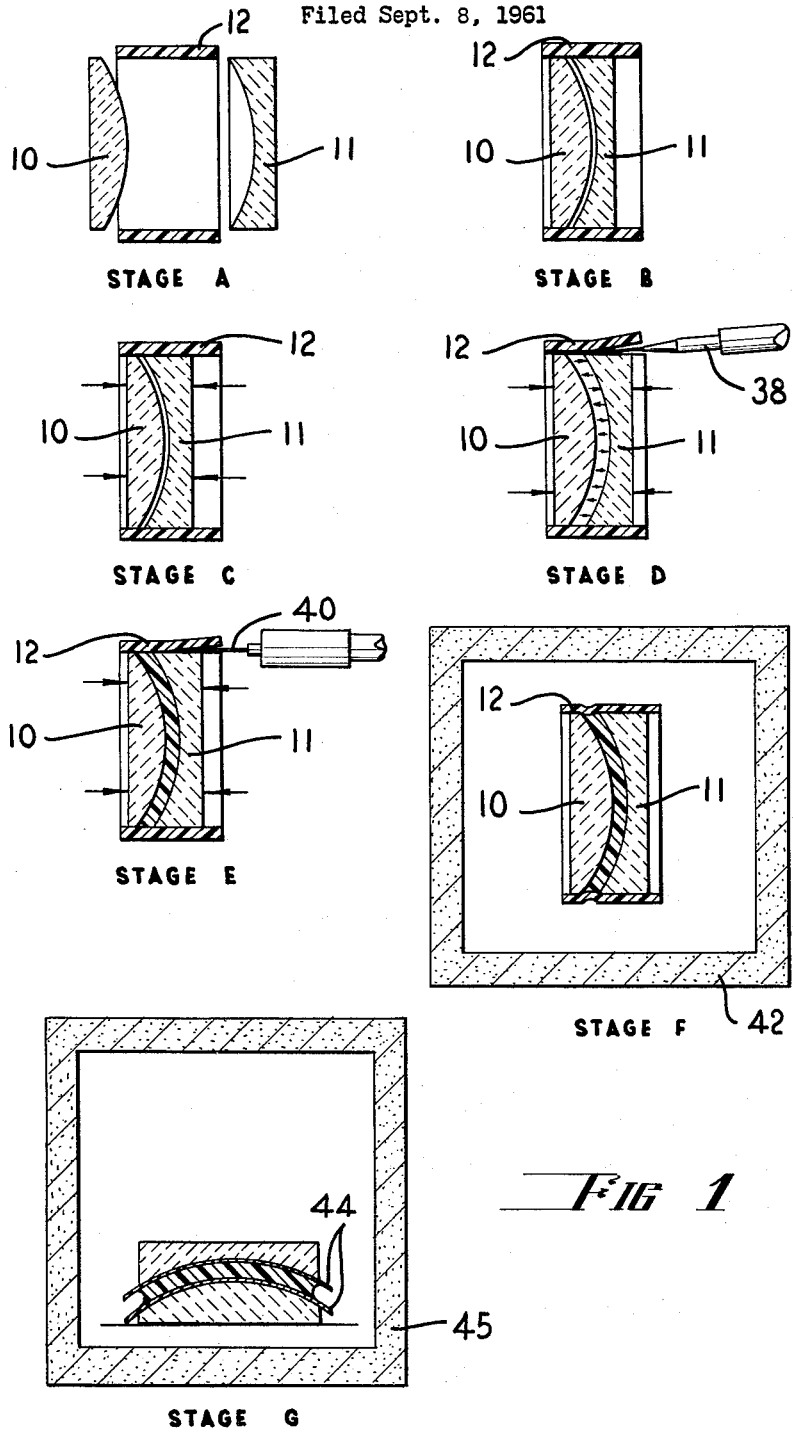

March 15, 1966  R. W. EWER  3,240,854
MANUFACTURE OF MOULDABLE PLASTIC ARTICLES
Filed Sept. 8, 1961

United States Patent Office 3,240,854
Patented Mar. 15, 1966

3,240,854
MANUFACTURE OF MOULDABLE PLASTIC ARTICLES
Ronald Wilfred Ewers, Torrens Park, South Australia, Australia, assignor to Laubman & Pank Limited, Adelaide, South Australia, Australia
Filed Sept. 8, 1961, Ser. No. 136,881
4 Claims. (Cl. 264—236)

This invention relates to improvements in the manufacture of mouldable plastic articles, for example in the manufacture of ophthalmic lenses cast from transparent plastic.

Plastic, such as allyl diglycol carbonate with benzoyl peroxide or isopropyl percarbonate as a catalyst, has been proposed for use in the manufacture of lenses. This resin when confined between polished glass surfaces and cured, results in an ophthalmic lens of high optical quality.

During the polymerization of this resin (allyl diglycol carbonate), considerable shrinkage takes place which necessitates use of resilient means associated with the casting dies. This resilient means has formerly consisted of a resilient spacer which is set between the dies, and in being so positioned, also functions as a spacer to give the desired thickness. In the past this problem has been overcome to a limited extent by making use of O rings between the polished dies. The O ring provided the necessary resilience when the catalyst resin was cured, and its thickness determined the lens thickness.

However, a number of problems have become evident with O rings:

In the first place, O rings of varying thickness are required due to the range of powers encountered in prescription work. Secondly, prism control is difficult to achieve because the O ring would require compression by different amounts around its periphery. Thirdly, with ophthalmic lenses the prescription normally requires a toroidal surface on one side of the lens combination with a spherical surface on the other. This requirement plus variations in the specification of center thickness to cover the range of powers mentioned above would call for the use of over five hundred different gaskets to cover the range of lenses required for perscription work.

With the object of overcoming the abovementioned problems and simplifying the production of lenses, the method according to this invention comprises the steps of inserting a pair of complementary dies into an enveloping tube of deformable material, separating the dies, inserting a hollow injection conduit into the space between the dies, injecting catalyzed resin into said space, and at least partly curing the catalyzed resin while in said space.

For the invention to be more clearly understood, it is described in further detail with reference to an embodiment which is illustrated in the accompanying drawings, in which:

FIG. 1 shows diagrammatically steps in the method according to the invention,

According to the embodiment of the invention disclosed in the drawing a pair of dies 10 and 11 formed from suitable glass with ground and polished surfaces of the desired contour are carefully washed with acetone, then with detergent and water and finally with water, and are then dried with a soft cloth. The dies 10 and 11 are then inserted with interference fit into a short length of tubing 12 of vinyl plastic (stage B).

After inserting one of the dies into the tubing 12, it is further cleaned with compressed air, and the complementary die is also similarly cleaned, so as to remove any trace of dust. The tubing being an interference fit over the dies 10 and 11 retains the dies in the position in which they are placed. The assembly of the complementary dies 10 and 11 within the tubing 12 is then placed in a die positioning means 13 (stage C).

The steps of the method of casting an optical lens are as follows:

After the assembly of dies 10 and 11 in the vinyl tubing 12 has been placed in the die positioning means 13, the vinyl tube 12 is lifted at the locality of one of the dies and air at pressure is introduced between the dies 10 and 11 by means of the air compressor hose 38, and the dies 10 and 11 are then moved outwardly under air pressure against the bull-nosed pins 33 and the ball points 24 respectively (stage D). The slidable V blocks 31 are then moved in by finger pressure to engage and retain the assembly of dies 10 and 11 in the tubing 12. Alternatively, the dies are clamped in the V blocks first.

A hollow injection conduit 40, which in this embodiment is a hyodermic syringe, is then inserted between the die 11 and the tubing 12, and catalyzed resin is injected into the space between the dies 10 and 11. The air within the cavity escapes between the wall of the die 11 and the plastic tubing 12 where the tubing is spread away from the wall of the die to allow entry of the needle. This is illustrated in FIG. 1 as stage E, and the assembly is then transferred to an oven 42 (stage F) where the plastic resin between the dies is cured.

The catalyst concentration used in this embodiment is from two to five percent of benzoyl peroxide (or isopropyl percarbonate) in allyl diglycol carbonate. With benzoyl peroxide as the catalyst the initial curing cycle is approximately twelve hours with a starting temperature of 65 degrees C. slowly rising to 105 degrees C. during this period. With isopropyl percarbonate as the catalyst the cycle would be approximately sixteen hours and the temperature 40 degrees C. to 80 degrees C. These times and temperatures vary according to the thickness of the lenses and oven efficiency.

The oven efficiency is of importance since the curing is exothermic and the oven must handle the dissipated heat. Thus air circulation within the oven and general sensitivity of the oven are factors in the determination of permissible rate of heat increase.

During this heating cycle the plastic tubing 12 becomes soft and readily follows the contour of the edge of the plastic lens and allows inward movement of the dies as shrinkage takes place. At the completion of the curing cycle the dies are removed from the vinyl envelope and separated from the plastic lens and then re-assembled using a soft tissue 44 as a spacer between the plastic lens and the dies so as to avoid readhesion during a post curing period (stage G) in an oven 45. This post curing is necessary to remove strain and to fully cure the resin, and is achieved by heating from ambient to 115 degrees C. over a period of three hours and maintaining at 115 degrees C. for a further two hours.

While the plastic envelope can be used a number of times, it is essentially regarded as a disposable item because of its low cost.

It will be seen that many variations could be introduced. For example it is not considered essential that the cast plastic should be allyl diglycol carbonate but other plastics could be used making use of the process.

What I claim is:

1. A method of manufacture of mouldable plastic articles, said method comprising inserting a pair of complementary dies into an enveloping tube of deformable material with an interference fit, injecting a fluid under pressure between said dies to displace the dies to adjustable preestablished spaced and angular oriented limit positions within the tube while the dies are retained by and within the tube, injecting catalyzed resin into the space between the dies while allowing the fluid between the dies to escape and at least partially curing the catalyzed resin in situ in said space, during which time the tube softens and allows inward movement of the dies due to shrinkage.

2. A method as claimed in claim 1, wherein the thus partially cured resin is separated from the tube and dies and thereafter reinserted between the dies with separating spacer elements therebetween, after which the resin is completely cured.

3. A method as claimed in claim 1, wherein the dies are first washed in acetone and then in water and thereafter cleaned with compressed air prior to insertion into the tube.

4. A method of manufacture of mouldable plastic articles comprising the steps of inserting a pair of complementary dies into an enveloping tube of constant cross-section deformable material, introducing air at pressure into the space between the dies to separate them while retained by and within the eveloping tube and urge the outer faces of the dies against pre-positioned locating means, inserting a hollow injection conduit into the space between the dies, injecting catalyzed resin into said space, and at least partly curing the catalyzed resin while in the said space.

References Cited by the Examiner
UNITED STATES PATENTS

| | | | |
|---|---|---|---|
| 806,783 | 12/1905 | Dayton | 18—26 |
| 2,298,429 | 10/1942 | Smith | 264—1 |
| 2,328,525 | 8/1943 | Egolf | 18—58 |
| 2,406,361 | 8/1946 | Fairbank et al. | 264—1 |
| 2,542,386 | 2/1951 | Beattie | 18—58 |
| 2,745,138 | 5/1956 | Beattie | 18—26 |
| 3,038,210 | 6/1962 | Hungerford et al. | 18—58 |

FOREIGN PATENTS 1,018,486   1/1953   France.

ROBERT F. WHITE, *Primary Examiner.*

WILLIAM J. STEPHENSON, ALEXANDER H. BRODMERKEL, *Examiners.*